(12) United States Patent
Gruendler et al.

(10) Patent No.: US 8,494,038 B2
(45) Date of Patent: Jul. 23, 2013

(54) COMMON MODE NOISE REDUCTION WITHIN DIFFERENTIAL SIGNAL

(75) Inventors: Nickolaus J. Gruendler, Manor, TX (US); Bhyrav Mutnury, Austin, TX (US); Terence Rodrigues, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/972,480

(22) Filed: Dec. 19, 2010

(65) Prior Publication Data

US 2012/0155527 A1    Jun. 21, 2012

(51) Int. Cl.
*H04B 3/46* (2006.01)

(52) U.S. Cl.
USPC ........... 375/226; 375/316; 375/295; 375/219; 375/221; 375/224; 375/227; 375/228

(58) Field of Classification Search
USPC ................. 375/316, 295, 219, 221, 224, 226, 375/227, 228
See application file for complete search history.

(56) References Cited

U.S. PATENT DOCUMENTS

| | | | |
|---|---|---|---|
| 6,466,626 B1 | 10/2002 | Cecchi et al. | |
| 7,295,618 B2 | 11/2007 | Hsu et al. | |
| 7,352,815 B2 | 4/2008 | Camara et al. | |
| 7,519,130 B2 | 4/2009 | Hsu et al. | |
| 7,606,302 B2 | 10/2009 | Mobin et al. | |
| 7,619,451 B1 | 11/2009 | Hoang et al. | |
| 7,660,349 B2 | 2/2010 | Tate et al. | |
| 8,030,968 B1* | 10/2011 | Avner et al. | 326/85 |
| 2005/0238093 A1 | 10/2005 | Payne et al. | |
| 2006/0256880 A1 | 11/2006 | Frisch | |
| 2007/0115035 A1 | 5/2007 | Hinz et al. | |
| 2008/0159371 A1* | 7/2008 | Mellitz | 375/232 |
| 2008/0219359 A1 | 9/2008 | Salomon | |
| 2008/0260049 A1 | 10/2008 | Wood | |
| 2009/0003463 A1 | 1/2009 | Muraoka et al. | |
| 2009/0161790 A1* | 6/2009 | Tanabe | 375/295 |
| 2009/0168859 A1* | 7/2009 | Tsubamoto et al. | 375/224 |
| 2009/0290651 A1* | 11/2009 | Okamura | 375/257 |
| 2009/0304054 A1* | 12/2009 | Tonietto et al. | 375/221 |
| 2010/0020859 A1 | 1/2010 | Suwada | |

FOREIGN PATENT DOCUMENTS

JP        11205245        7/1999

* cited by examiner

*Primary Examiner* — Siu Lee

(74) *Attorney, Agent, or Firm* — Thomas E. Tyson

(57) ABSTRACT

A receiver circuit detects an eye margin within a differential signal having a true component and a complement component. A transmitter circuit adjusts a phase between the true component and the complement component of the differential signal, based on the eye margin, to improve the eye margin. Improving the eye margin results from a reduction in common mode noise within the differential signal.

20 Claims, 3 Drawing Sheets

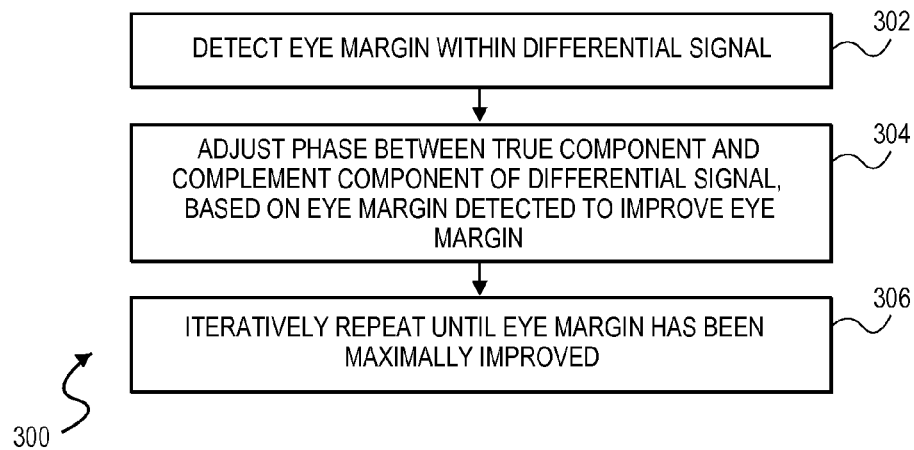
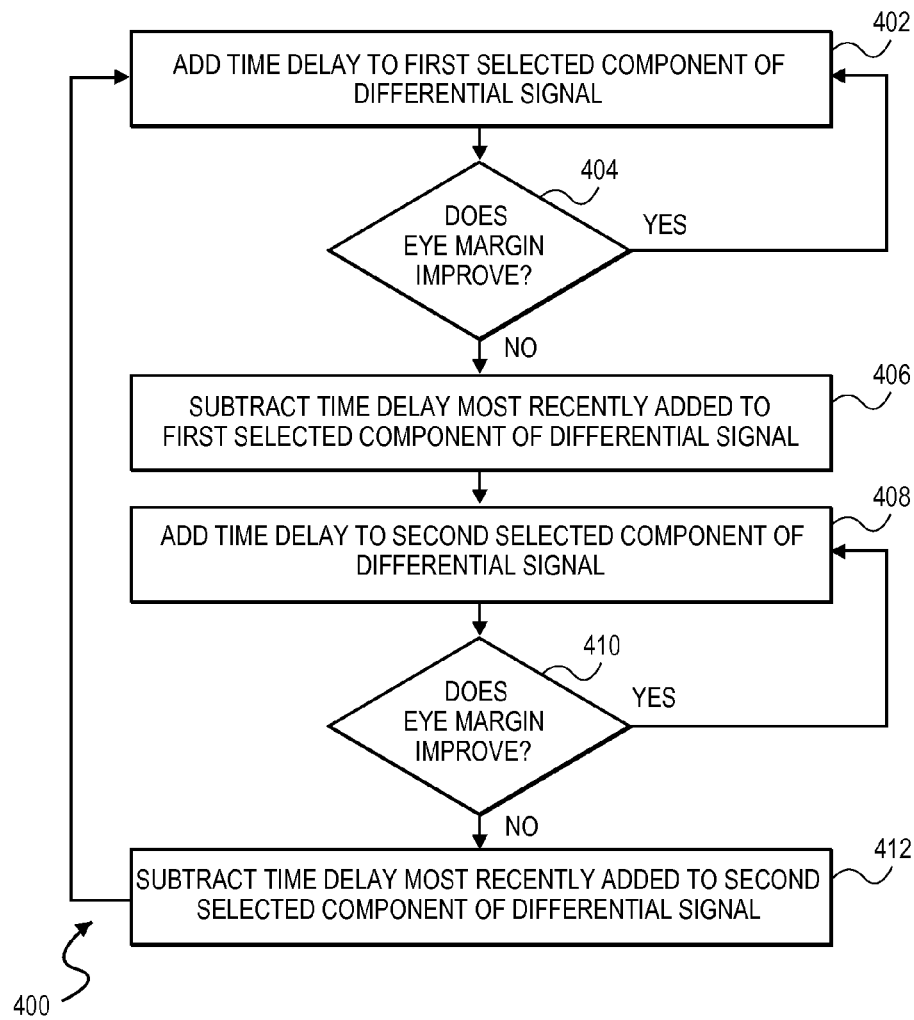

COMMON MODE NOISE REDUCTION WITHIN DIFFERENTIAL SIGNAL

BACKGROUND

There are two common signaling approaches for transmitting data from a transmitter circuit to a receiver circuit. In the first signaling approach, single-ended signaling is used. Single-ended signaling makes use of two conductors between the transmitter circuit and the receiver circuit: a dedicated signal line to send the signal from the transmitter circuit to the receiver circuit, and a common ground return shared by many signals.

In the second signaling approach, differential signaling is used. In differential signaling, true and complement forms of a signal are sent from the transmitter circuit to the transmitter circuit. While this approach also uses two conductors between the transmitter circuit and the receiver circuit, neither conductor is shared with other signals. As such, that differential signaling uses twice as many signal lines as single-ended signaling does.

Differential signaling has a number of advantages over single-ended signaling. One advantage is the ability of the differential receiver to reject signal components that are common to both lines. This ability is referred to as common mode rejection. Since a differential receiver is only sensitive to the difference between its two inputs, and most of the noise that is picked up by the signal lines is common to both lines, the receiver becomes immune to most noise sources. By comparison, with single-ended signaling, the external noise picked up by the signal line cannot be completely separated from the true signal.

SUMMARY OF THE INVENTION

A method of an embodiment of the invention includes detecting, by a receiver circuit, an eye margin within a differential signal having a true component and a complement component. The method includes adjusting, by a transmitter circuit, a phase between the true component and the complement component of the differential signal, based on the eye margin, to improve the eye margin. Improving the eye margin results from a reduction in common mode noise within the differential signal.

A system of an embodiment of the invention includes a receiver circuit to detect an eye margin within a differential signal having a true component and a complement component. The system includes a transmitter circuit to adjust a phase between the true component and the complement component of the differential signal, based on the eye margin, to improve the eye margin. Improving the eye margin results from a reduction in common mode noise within the differential signal.

A system of another embodiment of the invention includes a receiver means for detecting an eye margin within a differential signal having a true component and a complement component. The system includes a transmitter means for adjusting a phase between the true component and the complement component of the differential signal, based on the eye margin, to improve the eye margin. Improving the eye margin results from a reduction in common mode noise within the differential signal.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method to reduce common mode noise within a differential signal, according to an embodiment of the invention.

FIG. 4 is a flowchart of a particular method for adjusting the phase within a differential signal to reduce common mode noise within the differential signal, according to an embodiment of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, differential signaling is a signaling approach that provides for rejection of noise that is common to both the true component and the complement component of a differential signal. A true differential signal has almost zero common mode noise, and essentially provides for nearly perfect common mode rejection. However, differential signals are typically not truly differential.

For instance, mismatches in the lengths of the signal lines carrying the true and complement components of the differential signal can result in the differential signal becoming a common mode signal, resulting in common mode noise within the differential signal. While signal lines carrying the two components of a differential signal are nominally designed to be equal in length, in actuality they are typically equal in length just within a given tolerance. As such, there can still be sufficient length mismatch to result in common mode noise.

Conversion of a differential signal to a common mode signal, and the corresponding occurrence of common mode noise, can be caused by other factors as well. There may be jitter at just the transmitter circuit, and/or jitter within the entire system as a whole. Other causes of common mode conversion include weave effecting coupling of the components of a differential signal at connectors of the transmitter and receiver circuits, as well as electrical fields resulting from ball grid arrays (BGAs).

Disclosed herein are techniques to reduce such common mode noise resulting from a differential signal. A receiver circuit detects an eye margin between a true component and a complement component of a differential signal. A transmitter circuit adjusts a phase between the true and component components, based on the eye margin, to improve the eye margin. Improving the eye margin in this manner results from a reduction in common mode noise within the differential signal.

Figure 1A:
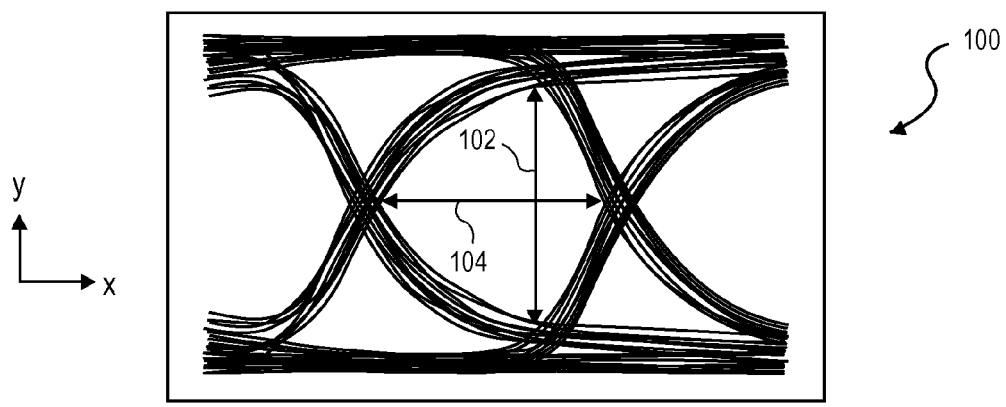
FIGS. 1A and 1B are diagrams of eye patterns, according to an embodiment of the invention.
Figure 1B:
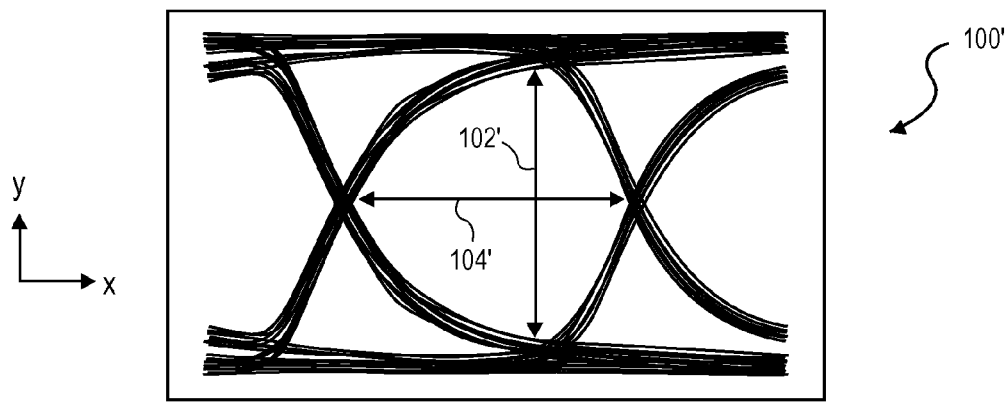

FIGS. 1A and 1B show an eye pattern 100 and 100', respectively, according to an embodiment of the invention. The eye pattern 100 of FIG. 1A shows a differential signal prior to common mode noise reduction using techniques disclosed herein. By comparison, the eye pattern 100' of FIG. 1B shows the same differential signal after the techniques disclosed herein have been applied to reduce common mode noise.

An eye pattern is also known as an eye diagram, and may be generally considered as an oscilloscope display in which a digital data signal from a receiver circuit is repetitively sampled and applied to on the y-axis, while the data rate is used to trigger a horizontal sweep on the x-axis. Such a pattern is referred to as an eye pattern, because the pattern typically looks like a series of eyes between a pair of upper and lower horizontal rails. In general, an open eye pattern corresponds to minimal signal distortion from causes such as noise. By comparison, distortion of the signal waveform due to noise and other interference appears as closure of the eye pattern.

What is referred to herein as an eye margin has two components: a vertical component and a horizontal component. For instance, in FIG. 1A, the vertical component 102 is the vertical gap within the eye pattern 100, and the horizontal component 104 is the horizontal gap within the eye pattern 100. Similarly, in FIG. 1B, the vertical component 102' is the vertical gap within the eye pattern 100', and the horizontal component 104' is the horizontal gap within the eye pattern 100'. The location at which the vertical and the horizontal gaps are measured does not matter, so long as the vertical and horizontal components 102' and 104' in FIG. 1B are measured at the same locations as the vertical and horizontal components 102 and 104 in FIG. 1A.

The eye pattern 100' shows a reduction in common mode noise as compared to the eye pattern 100. Specifically, the vertical component 102' of the eye margin in FIG. 1B is greater than the vertical component 102 of the eye margin in FIG. 1A. Likewise, the horizontal component 104' of the eye margin in FIG. 1B is greater than the horizontal component 104 of the eye margin in FIG. 1A. This translates to the eye pattern 100' of FIG. 1B being more open than the eye pattern 100' of FIG. 1A, corresponding to less distortion in the differential signal waveform, where less distortion means less common mode noise in the eye pattern 100'.

It is thus said that the eye pattern 100' of FIG. 1B has an improved eye margin as compared to the eye pattern 100 of FIG. 1A. The eye margin is improved because the eye pattern 100' is a more open eye pattern than the eye pattern 100. Stated another way, the eye pattern 100 is a more closed eye pattern than the eye pattern 100'.

Figure 2:
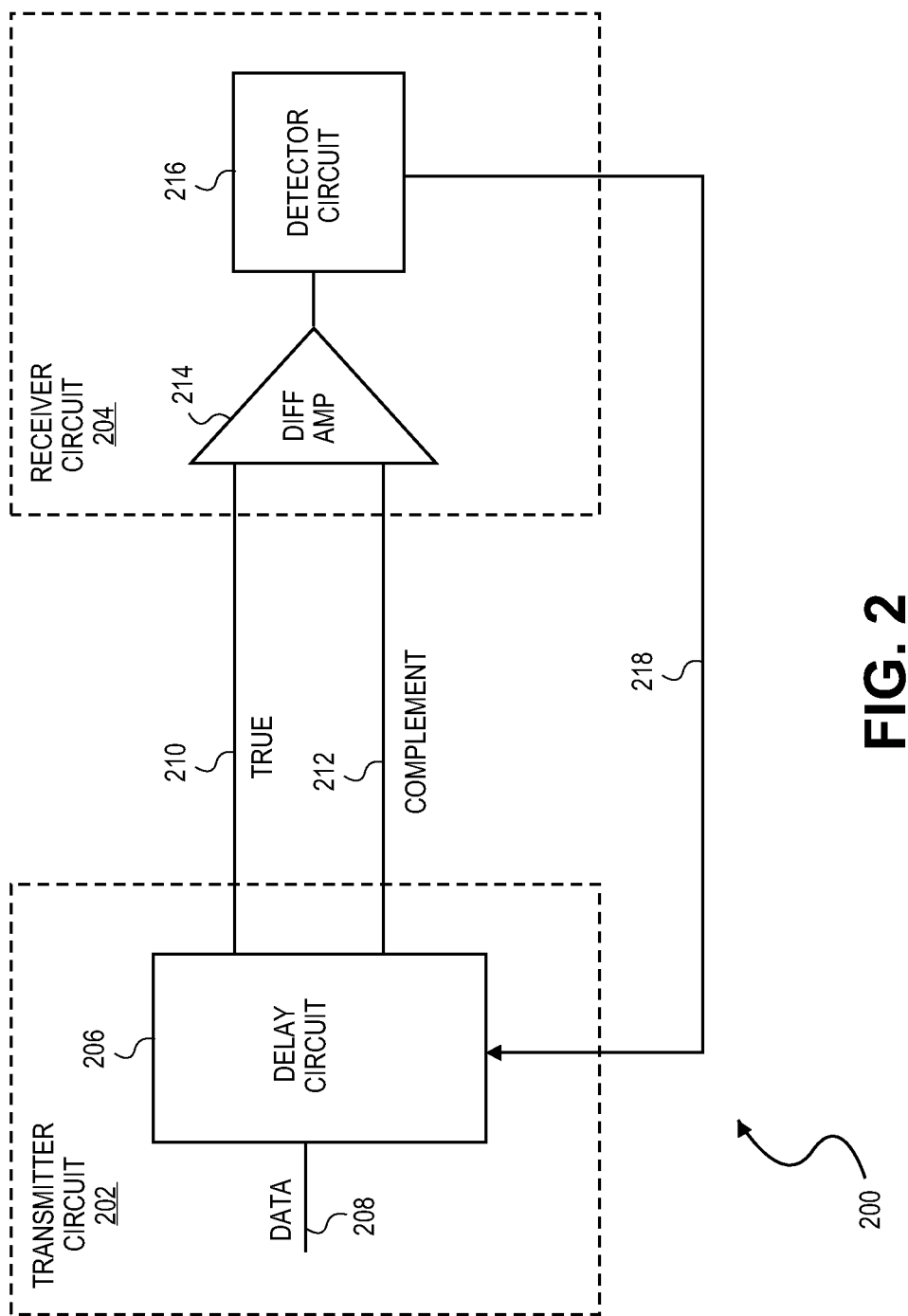
FIG. 2 is a diagram of a system in which common mode noise within a differential signal is reduced, according to an embodiment of the invention.

FIG. 2 shows a system 200, according to an embodiment of the invention. The system 200 may be implemented as one or more electronic devices. The transmitter circuit 202 includes a delay circuit 206, whereas the receiver circuit 204 includes a differential amplifier 214 and a detector circuit 216. Functionality ascribed to the delay circuit 206 can be said to be performed by the transmitter circuit 202 more generally, and functionality ascribed to the differential amplifier 214 and to the detector circuit 216 can be said to be performed by the receiver circuit 204 more generally. A transmitter means can be said to correspond to the transmitter circuit 202, and a receiver means can be said to correspond to the receiver circuit 204.

The transmitter circuit 202 transmits data received on a data line 208 over a true signal line 210 and over a complement signal line 212, to the receiver circuit 204. The complement signal on the complement signal line 212 is a complement of the true signal on the true signal line 210. That is, if the true signal varies from zero to X volts, then when the true signal is currently equal to Y volts, the complement signal is equal to X-Y volts. The true signal and the complement signal together make up a differential signal. In this respect, it is said that the true signal is the true component of the differential signal, and that the complement signal is the complement component of the differential signal.

In one embodiment, the transmitter circuit 202 may be a serial link transmitter, and the receiver circuit 204 may be a serial link receiver. In this embodiment, the differential signal is thus a serial link signal. For instance, the transmitter circuit 202 may be implemented at one electronic device, and the receiver circuit 204 may be implemented at another electronic device, where the two electronic devices communicate with one another.

The delay circuit 206 of the transmitter circuit 202 is able to introduce delays on either or both of the true signal and the complement signal. As such, the true signal on the true signal line 210 represents a potentially delayed version of the data on the data line 208. Similarly, the complement signal on the complement signal line 212 represents a potentially delayed version of a complement of the data on the data line 208. The delay circuit 206 is able to introduce the delay within the true signal independently of the delay the circuit 206 introduces within the complement signal.

The differential amplifier 214 of the receiver circuit 204 amplifies the difference between the true signal on the true signal line 210 and the complement signal on the complement signal line 212. In this way, noise introduced in both the true signal and the complement signal at corresponding identical times is cancelled out. For example, if the true signal is Y+N, where N is the noise, and at the same time the complement signal is (X-Y)+N, subtracting the complement signal from the true signal results in 2Y-X. Because the maximum value X of the true signal is known, it can be added back in, and the result divided by two, to yield Y.

The detector circuit 216 of the receiver circuit 204 generates an eye pattern of the differential signal. As such, the detector circuit 216 is said to detect an eye margin within the differential signal. The eye margin is the degree to which the eye pattern of the differential signal corresponds to an ideal eye pattern, representing the introduction of absolutely no noise or other interference within the differential signal. The eye margin can be determined by comparing the eye pattern generated from the differential signal to the ideal eye pattern. The eye margin is fed back to the delay circuit 206 of the transmitter circuit 202 on a feedback line 218.

The delay circuit 206 of the transmitter circuit 202 introduces a time delay into either or both of the true signal on the true signal line 210 and the complement signal on the complement signal line 212, based on the eye margin received from the detector circuit 216 of the receiver circuit 204. As such, the detector circuit 216 is said to adjust a phase between the true signal and the complement signal based on the eye margin. By adjusting the phase between the true signal and the complement signal, the conversion of the differential signal to a common mode signal is reduced in extent. The resulting eye margin detected by the detector circuit 216 is thus ultimately improved, which results from a corresponding reduction in common mode noise within the differential signal.

As noted above, adjusting the phase between the true signal and the complement signal can be achieved by introducing a time delay to either or both of these signals. Initially, for instance, the complement signal is in-phase with the true signal, such that at time t if the true signal is at voltage Y, then the complement signal is at voltage X-Y at the same time t. If a time delay of d is introduced into the complement signal, then when the true signal is at voltage Y at time t, the complement signal is at voltage X-Y at time t+d. By comparison, if a time delay of d is instead introduced into the true signal, then when the true signal is at voltage Y at time t, the complement signal is at voltage X-Y at time t−d.

A particular approach by which the detector circuit 216 adjusts the phase between the true signal on the true signal line 210 and the complement signal on the complement signal line 212 is described later in the detailed description. However, it is noted that the detector circuit 216 of the receiver circuit 204 and the delay circuit 206 of the transmitter circuit 202 form a feedback loop. As the delay circuit 206 adjusts the phase between the true signal and the complement signal, the eye margin detected by the detector circuit 216 changes. As such, the delay circuit 206 can iteratively adjust the phase to maximally improve the eye margin detected by the detector circuit 216, by reducing common mode noise (i.e., to nullify the effect of common mode noise that is introduced). The eye pattern generated at the detector circuit 216 may never perfectly match an ideal eye pattern, though, insofar as other interference besides common mode noise may cause the deviation of the generated eye pattern from the ideal eye pattern.

FIG. 3 shows a method 300 for reducing common mode noise within a differential signal. The method 300 is described in relation to the system 200 of FIG. 2. The method 300 is performed in relation to a differential signal having a true component on the true signal line 210, and a complement component on the complement signal line 212.

The detector circuit 216 detects an eye margin within the differential signal (302). For instance, detecting the eye margin can include detecting the horizontal component and/or the vertical component of the eye margin. The horizontal component of the eye margin is the horizontal component of the eye pattern generated from the differential signal as compared to an ideal eye pattern. Likewise, the vertical component of the eye margin is the vertical component of the eye pattern generated from the differential signal as compared to the ideal eye pattern.

The delay circuit 206 adjusts the phase between the true component and the complement component of the differential signal based on the eye margin detected, to improve the eye margin (304). The delay circuit 206 may adjust the phase to improve the horizontal component and/or the vertical component of the eye margin, depending on which of these components the detector circuit 216 has fed back to the delay circuit 206.

The delay circuit 206 may adjust the phase between the true and complement components by introducing a time delay into either or both these components of the differential signal. The method 300 can be iteratively repeated until the eye margin has been maximally improved (306). Improving the eye margin results from a reduction in common mode noise within the differential signal. Stated another way, by adjusting the phase between the true and complement components, the delay circuit 206 reduces the common mode noise within the differential signal, which is manifested by an improved eye margin detected by the detector circuit 216. That is, the extent to which the differential signal has been converted to a common mode signal is reduced.

FIG. 4 shows a method 400 of a particular approach for adjusting the phase within a differential signal to reduce common mode noise within the differential signal, according to an embodiment of the invention. Specifically, a time delay is added to a first selected component of the differential signal (402). The time delay added in part 402 may be a minimal discrete amount of delay.

Either the true component of the differential signal may be the first selected component, or the complement component of the differential signal may be the first selected component. Where the true component is the first selected component, then the complement component is said to be the second selected component of the differential signal. Likewise, where the complement component is the first selected component, then the true component is said to be the second selected component of the differential signal.

If the eye margin improves as a result of adding the time delay to the first selected component (404), then the method 400 is repeated at part 402, such that another time delay is added to the first selected component. However, if the eye margin does not improve (406), then the time delay most recently added to the first selected component in part 402 is removed or subtracted (406), and a time delay is instead added to the second selected component of the differential signal (408). If the eye margin improves as a result of adding the time delay to the second selected component (410), then the method 400 is repeated at part 408, such that another time delay is added to the second selected component. However, if the eye margin does not improve (410), then the time delay most recently added to the second selected component is removed or subtracted (412), and the method 400 again adds a time delay to the first selected component (402).

The method 400 thus represents a hysteresis-like approach for adjusting the phase between the true and complement components of a differential signal, to compensate for dynamic common mode noise within the differential signal. The method 400 constantly is adding and subtracting time delays in an attempt to maximally optimize the eye margin of the differential signal. As such, the method 400 is one way by which the phase within the differential signal can be adjusted to reduce common mode noise within the differential signal.

However, in another embodiment, the method 400 can terminate after part 404 or part 410 is performed. That is, once the eye margin has improved by more than a threshold, or once the eye margin has a given value within a threshold, the method 400 can terminate after part 404 or part 410 is performed, instead of looping back to part 402 or part 408, respectively. This embodiment differs from the embodiment disclosed in the previous paragraph, in which there is hysteresis.

The method 400 can be said to implement part 304 of the method 300 of FIG. 3. As noted above, in the method 300, the eye margin is detected (302), the phase between the true and complement components is adjusted based on the eye margin (304), and the method 300 iteratively repeated (306). The first time part 304 of the method 300 is performed, part 402 of the method 400 is performed. The next time part 304 of the method 300 is performed, depending on the result of part 404 of the method 400, either part 402 is again performed, or parts 406 and 408 of the method 400 are performed. Assuming the latter, the third time part 304 of the method 300 is performed, depending on the result of part 410, either part 408 is again performed, or parts 412 and 402 are performed. In this way, the method 400 is said to implement part 304 of the method 300.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   detecting, by a receiver circuit, an eye margin within a differential signal having a true component and a complement component;
   adjusting, by a transmitter circuit, a phase between the true component and the complement component of the differential signal, based on the eye margin, to improve the eye margin,
   wherein improving the eye margin results from a reduction in common mode noise within the differential signal.

2. The method of claim 1, further comprising iteratively repeating detecting the eye margin and adjusting the phase until the eye margin has been maximally improved.

3. The method of claim 1, wherein detecting the eye margin within the differential signal comprises detecting one or more of a horizontal component and a vertical component of the eye margin.

4. The method of claim 3, wherein adjusting the phase between the true component and the complement component of the differential signal, based on the eye margin, comprises adjusting the phase to improve the one or more of the horizontal component and the vertical component of the eye margin.

5. The method of claim 1, wherein adjusting the phase between the true component and the complement component of the differential signal, based on the eye margin, comprises:
   adding a first time delay to a first selected component of the true component and the complement component of the differential signal, such that where the first selected component is the true component a second selected component is the complement component, and where the first selected component is the complement component the second selected component is the true component;
   where the eye margin has improved after the first time delay has been added to the first selected component, adding the first time delay to the first selected component again.

6. The method of claim 5, wherein adjusting the phase between the true component and the complement component of the differential signal, based on the eye margin, further comprises, where the eye margin has not improved after the first time delay has been added to the first selected component:
   removing the first time delay from the first selected component;
   adding a second time delay to the second selected component;
   where the eye margin has improved after the second time delay has been added to the second selected component, adding the second time delay to the second selected component again.

7. A system comprising:
   a receiver circuit to detect an eye margin within a differential signal having a true component and a complement component; and,
   a transmitter circuit to adjust a phase between the true component and the complement component of the differential signal, based on the eye margin, to improve the eye margin,
   wherein improving the eye margin results from a reduction in common mode noise within the differential signal.

8. The system of claim 7, wherein the receiver circuit and the transmitter circuit are to iteratively repeat detecting the eye margin and adjusting the phase until the eye margin has been maximally improved.

9. The system of claim 7, wherein the receiver circuit is to detect the eye margin within the differential signal by detecting one or more of a horizontal component and a vertical component of the eye margin.

10. The system of claim 9, wherein the transmitter circuit is to adjust the phase between the true component and the complement component of the differential signal, based on the eye margin, by adjusting the phase to improving the eye margin results from a reduction in common mode noise within the differential signal.

11. The system of claim 7, wherein the transmitter circuit is to add a first time delay to a first selected component of the true component and the complement component of the differential signal,
   wherein where the first selected component is the true component a second selected component is the complement component, and where the first selected component is the complement component the second selected component is the true component,
   and wherein where the eye margin has improved after the first time delay has been added to the first selected component, the transmitter circuit is to add the first time delay to the first selected component again.

12. The system of claim 11, wherein where the eye margin has not improved after the first time delay has been added to the first selected component, the transmitter circuit is to remove the first time delay from the first selected component and add a second time delay to the second selected component,
   and wherein where the eye margin has improved after the second time delay has been added to the second selected component, the transmitter circuit is to add the second time delay to the second selected component again.

13. The system of claim 7, wherein the transmitter circuit is to transmit the differential signal to the receiver circuit, and the receiver circuit is to receive the differential signal from the transmitter circuit.

14. The system of claim 7, wherein the transmitter circuit and the feedback circuit form a feedback loop by which the differential signal is adjusted based on the eye margin.

15. The system of claim 7, wherein the differential signal is a serial link signal, the transmitter circuit is a serial link transmitter, and the receiver circuit is a serial link receiver.

16. A system comprising:
   receiver means for detecting an eye margin within a differential signal having a true component and a complement component; and,
   transmitter means for adjusting a phase between the true component and the complement component of the differential signal, based on the eye margin, to improve the eye margin,
   wherein improving the eye margin results from a reduction in common mode noise within the differential signal.

17. The system of claim 16, wherein the receiver means and the transmitter means are for iteratively detecting the eye margin and adjusting the phase until the eye margin has been maximally improved.

18. The system of claim 16, wherein the receiver means is for detecting one or more of a horizontal component and a vertical component of the eye margin.

19. The system of claim 18, wherein the transmitter means is for adjusting the phase to improve the one or more of the horizontal component and the vertical component of the eye margin.

20. The system of claim 16, wherein the transmitter means and the feedback mean form a feedback loop by which the differential signal is adjusted based on the eye margin.

\* \* \* \* \*